(12) United States Patent
Lu et al.

(10) Patent No.: US 8,369,633 B2
(45) Date of Patent: Feb. 5, 2013

(54) VIDEO CODEC METHOD AND SYSTEM

(75) Inventors: Jinghui Lu, Tianjing (CN); Song Qiu, Tianjing (CN); Hao Wang, Tianjing (CN)

(73) Assignee: Vimicro Corporation, Beijing (CN)

( * ) Notice: Subject to any disclaimer, the term of this patent is extended or adjusted under 35 U.S.C. 154(b) by 775 days.

(21) Appl. No.: 12/605,255

(22) Filed: Oct. 23, 2009

(65) Prior Publication Data

US 2011/0096990 A1   Apr. 28, 2011

(30) Foreign Application Priority Data

Nov. 14, 2009   (CN) .......................... 2008 1 0226179

(51) Int. Cl.
*G06K 9/46* (2006.01)
(52) U.S. Cl. ....................................... 382/236; 382/239
(58) Field of Classification Search .................. None
See application file for complete search history.

(56) References Cited

U.S. PATENT DOCUMENTS

| | | | | |
|---|---|---|---|---|
| 6,744,927 | B1 * | 6/2004 | Kato | 382/239 |
| 7,650,058 | B1 * | 1/2010 | Garoutte | 386/326 |
| 8,005,143 | B2 * | 8/2011 | Isu et al. | 375/240.12 |
| 2006/0204113 | A1 * | 9/2006 | Wang et al. | 382/236 |
| 2006/0238445 | A1 * | 10/2006 | Wang et al. | 345/55 |
| 2011/0051808 | A1 * | 3/2011 | Quast et al. | 375/240.08 |

OTHER PUBLICATIONS

NPL-Lundmark et al, 2005, Interest Factor Controlled Compression of Imagery.*
Iraide Unanue et al., A Tutorial on H.264/SVC Scalable Video Coding Jun. 2011; ISBN: 978-953-307-181-7 in book: Recent Advances on Video Coding.*

* cited by examiner

*Primary Examiner* — Chan S Park
*Assistant Examiner* — Ha Le
(74) *Attorney, Agent, or Firm* — Wuxi Sino IPs Ltd; Joe Zheng (57) ABSTRACT

Techniques pertaining to scalable video codec are disclosed. According to one aspect of the present invention, a video image is analyzed and a region of interest (ROI) and a region of non-interest (non-ROI) are identified. By comparing the non-ROI image with that of a previous image, a background ignored identifier is created indicating whether the non-ROI can be ignored during encoding and decoding processes. Based on the status of the background ignored identifier, the encoder encodes the images into a basic layer (BL) and an enhanced layer (EL), and transmits the coded bit streams along with the identifier to a decoder. The decoder reconstructs the image based on the identifier and the BL and the EL bit streams.

11 Claims, 6 Drawing Sheets

VIDEO CODEC METHOD AND SYSTEM

BACKGROUND OF THE INVENTION

1. Field of the Invention

The present invention relates to image processing fields, more particularly to video codec methods and systems.

2. Description of Related Art

With continuous advancements in electronics and information technologies and use of internet, remote video surveillance techniques have been developed and used in various applications, e.g., traffic management, security monitoring, or forest fire monitoring. However, users in different types of networks may have different requirements for the video images because different types of networks have different bandwidth performances. Hence, scalable video coding techniques are developed to meet the above requirements.

The scalable video coding (SVC) technique is provided to encode image frames of a video sequence in multiple layers. The first layer, also called base layer (BL), contains a minimum required image data, and the remaining layers, also called enhancement layers (EL), contain the refinements to the data carried by the base layer. This technique makes scalability possible as a receiver can choose to receive only the layers desired and ignore the rest depending on its required resolution and the bit transfer rate capacity of the network.

Figure 1:
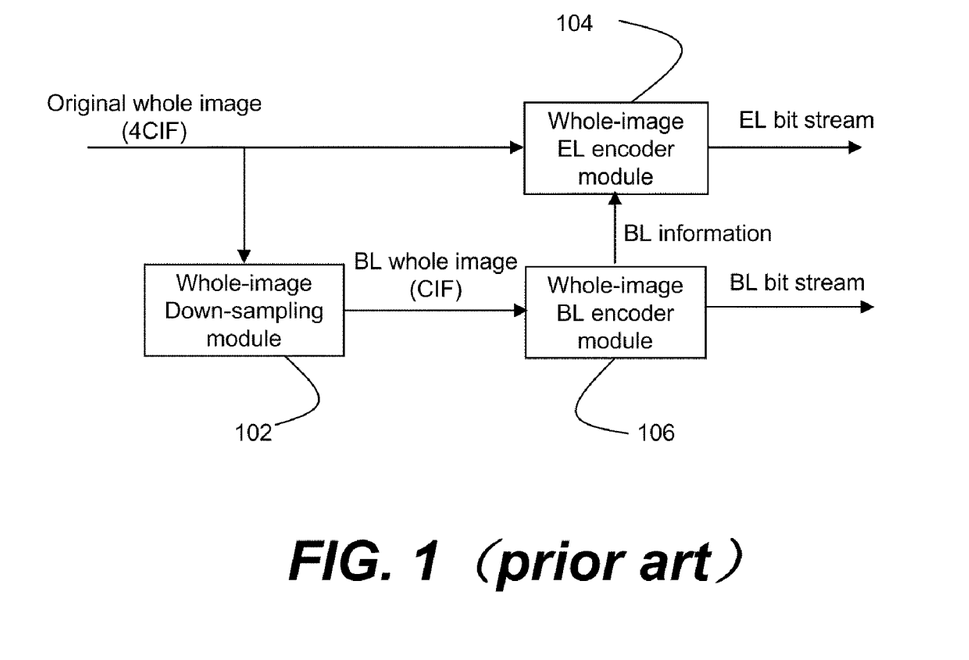
FIG. 1 is a block diagram showing a spatial SVC encoder in the prior art.

The spatial scalability is one type of scalable video coding techniques capable of encoding an image frame of a video sequence into two layers at the same frame rate but in different spatial resolutions. The original image of the video sequence is down-sampled to a low spatial resolution base layer image, and the original image is to be coded as the enhancement layer depending on the base layer. Subsequently, the bit stream of the coded base layer is decoded independently, and the bit stream of the coded enhancement layer is decoded based on the reconstructed base layer image. Referring to FIG. 1, there is a block diagram showing a spatial SVC coder in the prior art. An original whole image of size 4xCIF (Common Intermediate Format) is down-sampled by a whole-image down-sampling module 102 to generate a BL whole image of size CIF. A whole-image BL encoder module 106 encodes the BL whole image and generates a BL bit stream and BL data. A whole-image EL encoder module 104 encodes the original whole image and generates an EL bit stream.

In some video monitoring applications, it is only necessary to pay attention to special regions (e.g., doors and windows etc.) in an image and ignore the background regions. In other words, the content of the regions of interest (ROI) may be retained as detailed as possible, while the details of the region of non-interest (non-ROI) may be ignored.

In the current video SVC codec technique, the coding and decoding are performed on the whole video image. But the resolution of the BL image is relatively low, resulting in the loss of details of the image. If the whole image is encoded as the enhancement layer to improve the resolution, the network bandwidth is required to increase to accommodate the higher bit transfer rate. Applications of current video codec technique is, therefore, limited either by the resolution of the image or the bandwidth of the network.

Thus, improvements on the current video codec techniques are desired to overcome the above-mentioned disadvantages and others.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

The invention pertains to codec methods and systems. According to one aspect of the invention, the system includes an intelligent module, an encoder, and a decoder. The intelligent module analyzes the region of non-interest and creates an identifier to identify a background to be ignored. The encoder includes an ROI cropping module to crop the region of interest from the video image according to the identifier, a down-sampling module to obtain a base layer (BL) image by down-sampling the video image or the cropped ROI image. A BL encoder module is employed to generate a BL bit stream and BL information (data) by coding the BL image. An EL encoder module is employed to generate an enhancement layer bit stream by coding the cropped ROI image depending on the base layer information. A transmitting module is also employed to transmit the coded bit streams and the identifier to the decoder. The decoder receives the bit streams from the transmitting module, decodes the base layer bit stream to reconstruct a base layer image and decodes the enhancement layer bit stream in reference to the reconstructed base layer image to generate an image of the region of interest of the video image.

Depending on the status of the background-ignored identifier, the non-ROI image may be up-sampled to recreate the original non-ROI images and combined it with the ROI image to recreate the original image, or may be discarded without any further process. The present invention discloses a video codec technique to retain the desired details of a video image without the need to increasing the bandwidth of the network.

The present invention may be implemented in many forms including a method, a system, an apparatus or a part of a system. According to one embodiment, the present invention is a method for encoding an image. The method comprises: receiving the image in a module; cropping a region of interest from the image in reference to an identified region of interest and an identified region of non-interest and; down-sampling the original image or the cropped region of interest of the image to obtain a base layer image; encoding the base layer image to generate a base layer bit stream and base layer data; and encoding the cropped region of interest of the image depending on the base layer data to generate an enhancement layer bit stream.

According to another embodiment, the present invention is a method for decoding an image. The method comprises: receiving an enhancement layer bit stream and a base layer bit stream from a video encoder; extracting a background ignored identifier from either one of the enhancement layer bit stream and the base layer bit stream; decoding the base layer bit stream to generate a reconstructed base layer image; and decoding the enhancement layer bit stream depending on the reconstructed base layer image and the background ignored identifier to generate a reconstructed region of interest of an original image.

According to yet another embodiment, the present invention is an encoder for coding an image. The encoder comprises: an ROI cropping module configured to crop the region of interest from the image according to a background ignored identifier; a down-sampling module configured to down-sample the image or the cropped region of interest of the image to obtain a base layer image; a BL encoder module configured to code the base layer image to generate a base layer bit stream and base layer data; and an EL encoder module configured to code the cropped region of interest of the image depending on the base layer data to generate an enhancement layer bit stream.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 2-9. However, those skilled in the art will readily appreciate that the detailed description given herein with respect to these figures is for explanatory purposes only as the invention extends beyond these limited embodiments.

One advantage, feature or object of the present invention is that only a region of interest (ROI) of an original image is enhancement layer (EL) coded to produce an EL bit stream. In one embodiment, a background ignored identifier indicating whether a region of non-interest (non-ROI, or background image) of an original image can be ignored is set by an intelligent analysis module. The intelligent analysis module is configured to analyze the non-ROI of a captured image. It generates an effective background ignored identifier when the non-ROI of the current image is substantially similar to that of a previous image, otherwise, generates an ineffective background ignored identifier. An effective background ignored identifier indicates EL-coding only the ROI; an ineffective background ignored identifier indicates EL-coding the whole image including ROI and non-ROI.

When an encoder transmits a base layer (BL) bit stream and an EL bit stream to a decoder, it is necessary to inform the decoder whether the non-ROI is ignored when BL encoding is performed. Depending on the implementation, an EL background ignored identifier and a BL background ignored identifier are used as new frame or sequence level parameters to indicate whether the non-ROI is ignored in the EL bit stream and the BL bit stream. The EL and the BL background ignored identifiers may be transmitted along with other frame, or sequence level, parameters, such as an image header or an image parameter set. For example, the background ignored identifier can be denoted by one binary bit. A "1" indicates that the background is ignored and only the ROI is EL-coded while a "0" indicates that the background is not ignored and the whole image is EL-coded.

Figure 2:
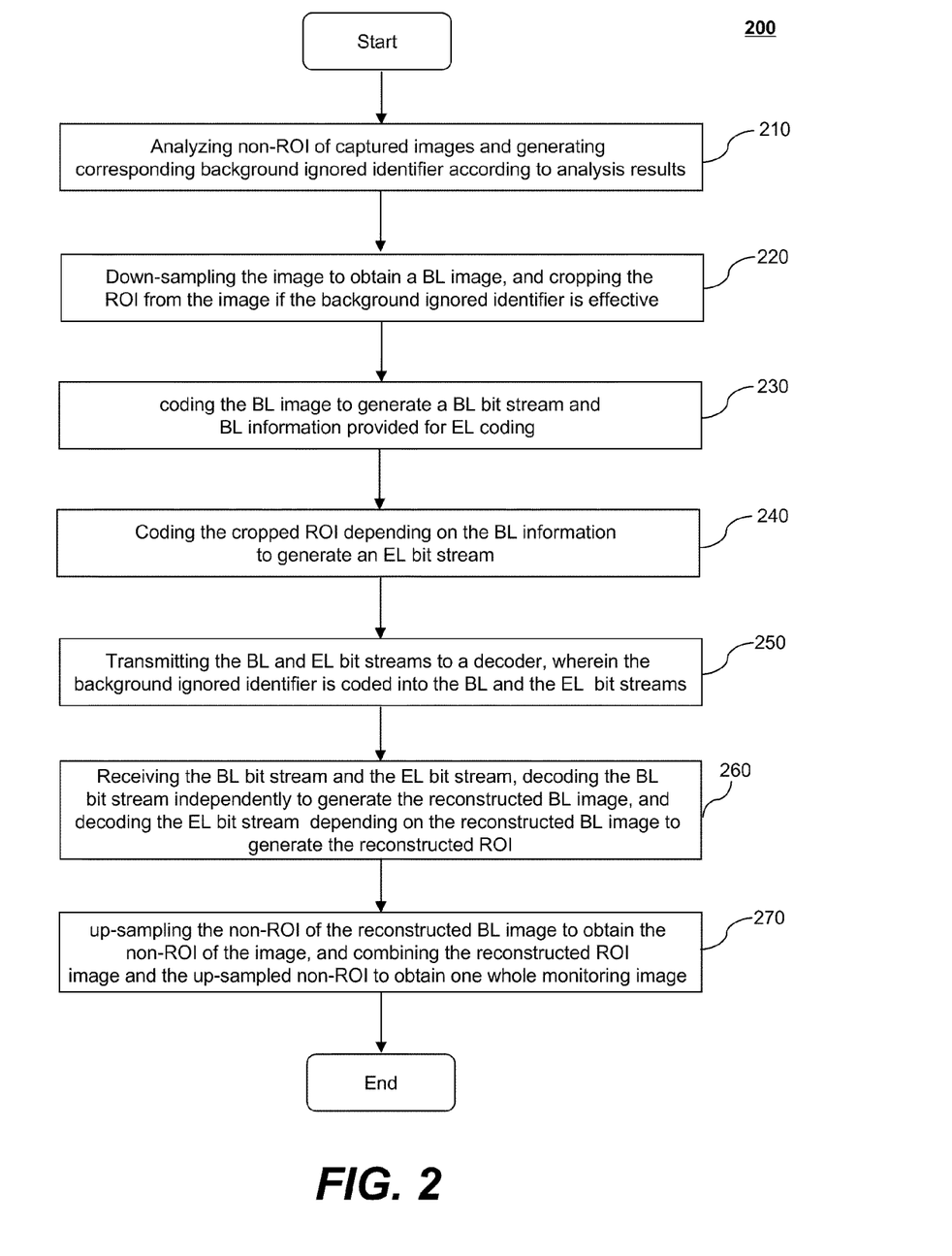
FIG. 2 is a flow chart showing a video codec method according to a first embodiment of the present invention.

FIG. 2 is a flow chart showing a video codec method 200 according to a first embodiment of the present invention. At 210, an intelligent analysis module is configured to analyze a non-ROI of a captured image, determine whether the non-ROI of the original image has substantial changes relative to a previous non-ROI image. The intelligent analysis module generates an ineffective background ignored identifier if the non-ROI has substantial changes, otherwise, generates an effective background ignored identifier.

At 220, an encoder is configured to down-sample the image to obtain a BL image, determine whether the background ignored identifier is effective, and crop the ROI from the image if the background ignored identifier is effective, or take the whole image if the background ignored identifier is ineffective.

At 230, the encoder is configured to code the BL image to generate a BL bit stream and BL information (data) for subsequent EL coding. In one embodiment, the ROI and the non-ROI of the BL image are coded in different slices to decrease correlation between the ROI and the non-ROI.

At 240, the encoder is configured further to code the cropped ROI depending on the BL information to generate an EL bit stream if the background ignored identifier is effective, or the encoder is configured further to code the whole image depending on the BL data to generate an EL bit stream if the background ignored identifier is ineffective.

At 250, the encoder is configured further to transmit the BL bit stream and the EL bit stream to a decoder, wherein the background ignored identifier is coded into the BL and the EL bit streams.

At 260, the decoder is configured to receive the BL bit stream and the EL bit stream, decode the BL bit stream to generate the reconstructed BL image and decode the EL bit stream depending on the reconstructed BL image to generate a reconstructed ROI if the background ignored identifier is effective, or decode the EL bit stream depending on the reconstructed BL image to generate the reconstructed whole original image if the background ignored identifier is ineffective.

At 270, the decoder is configured further to up-sample the non-ROI of the reconstructed BL image to obtain the non- ROI of the image, and combine the reconstructed ROI image and the up-sampled non-ROI to obtain one whole monitoring image.

Figure 3:
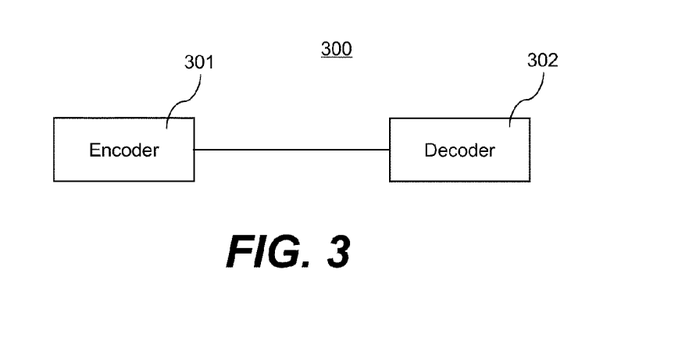
FIG. 3 is a block diagram showing a video codec system according to the first embodiment of the present invention.

FIG. 3 is a block diagram showing a video codec system 300 according to the first embodiment of the present invention. Referring to FIG. 3, the video codec system 300 comprises an encoder 301 and a decoder 302. The encoder 301 is configured to down-sample an original image to obtain a BL image, code the BL image to generate a BL bit stream and BL information provided for the subsequent EL coding, crop a ROI image from the original image according to a background ignored identifier, EL code the ROI image depending on the BL information to generate an EL bit stream, and transmit the BL bit stream, the EL bit stream, the background ignored identifier and other frame or sequence level parameters to the decoder 302. The decoder 302 is configured to receive the BL bit stream, the EL bit stream, the background ignored identifier and other frame parameters, decode the BL bit stream to generate the reconstructed BL image, decode the EL bit stream depending on the reconstructed BL image to generate the reconstructed ROI of the original image if the background ignored identifier is effective, up-sample the non-ROI of the reconstructed BL image to obtain the non-ROI of the original image, and combine the reconstructed ROI image and the non-ROI of the image to obtain one whole monitoring image.

Figure 4:
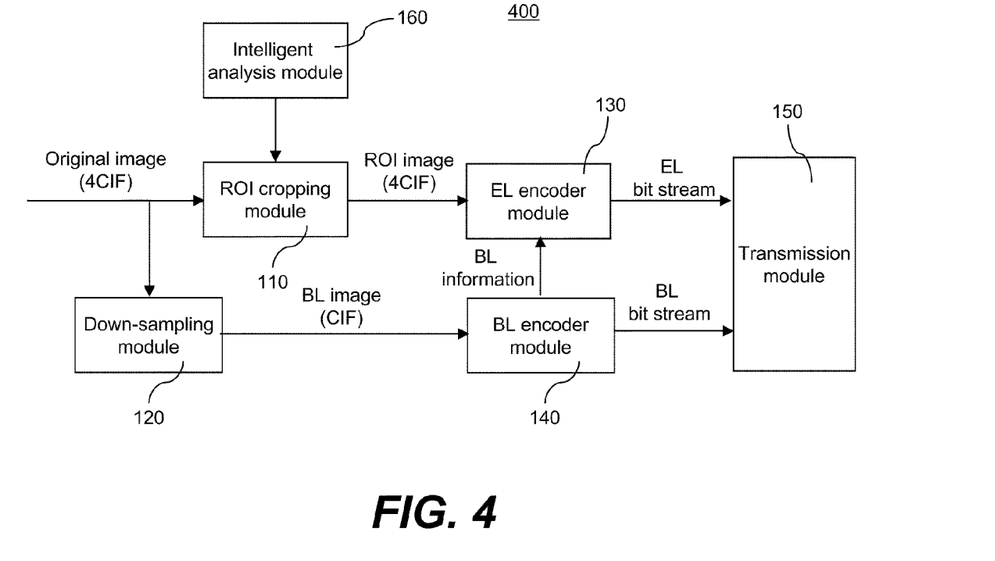
FIG. 4 is a block diagram showing a video encoder according to the first embodiment of the present invention.

FIG. 4 is a block diagram showing a video encoder 400 according to the first embodiment of the present invention, referring to FIG. 4, the video encoder 400 comprises a ROI cropping module 110, a down-sampling module 120, an EL encoder module 130 and a BL encoder module 140. The ROI cropping module 110 is configured to crop an ROI image from an original image according to a background ignored identifier. The down-sampling module 120 is configured for down-sampling the image to obtain a BL image. The BL encoder module 140 is configured to encode the BL image to generate a BL bit stream and BL data for the EL encoder module 130. The EL encoder module 130 is configured to encode the ROI image cropped by the ROI cropping module 110 depending on the BL data from the BL encoder module 140 to generate an EL bit stream.

In one embodiment, the video encoder 400 further comprises a transmission module 150 configured to transmit the BL bit stream and the EL bit stream to the decoder 302. The transmission module 150 is configured further to transmit the background ignored identifier and other frame or sequence level parameters.

In one embodiment, the video encoder 400 further comprises an intelligent analysis module 160 configured to analyze the non-ROI image of the original image and determine whether the non-ROI of the image has substantial changes from a previous no-ROI image. The intelligent analysis module 160 then generates an ineffective background ignored identifier if the non-ROI has substantial changes, otherwise, it generates an effective background ignored identifier.

It can be seen that the whole BL image are BL-coded and only the ROI of the image are EL-coded if the background ignored identifier is effective according to the first embodiment of the present invention.

Figure 5:
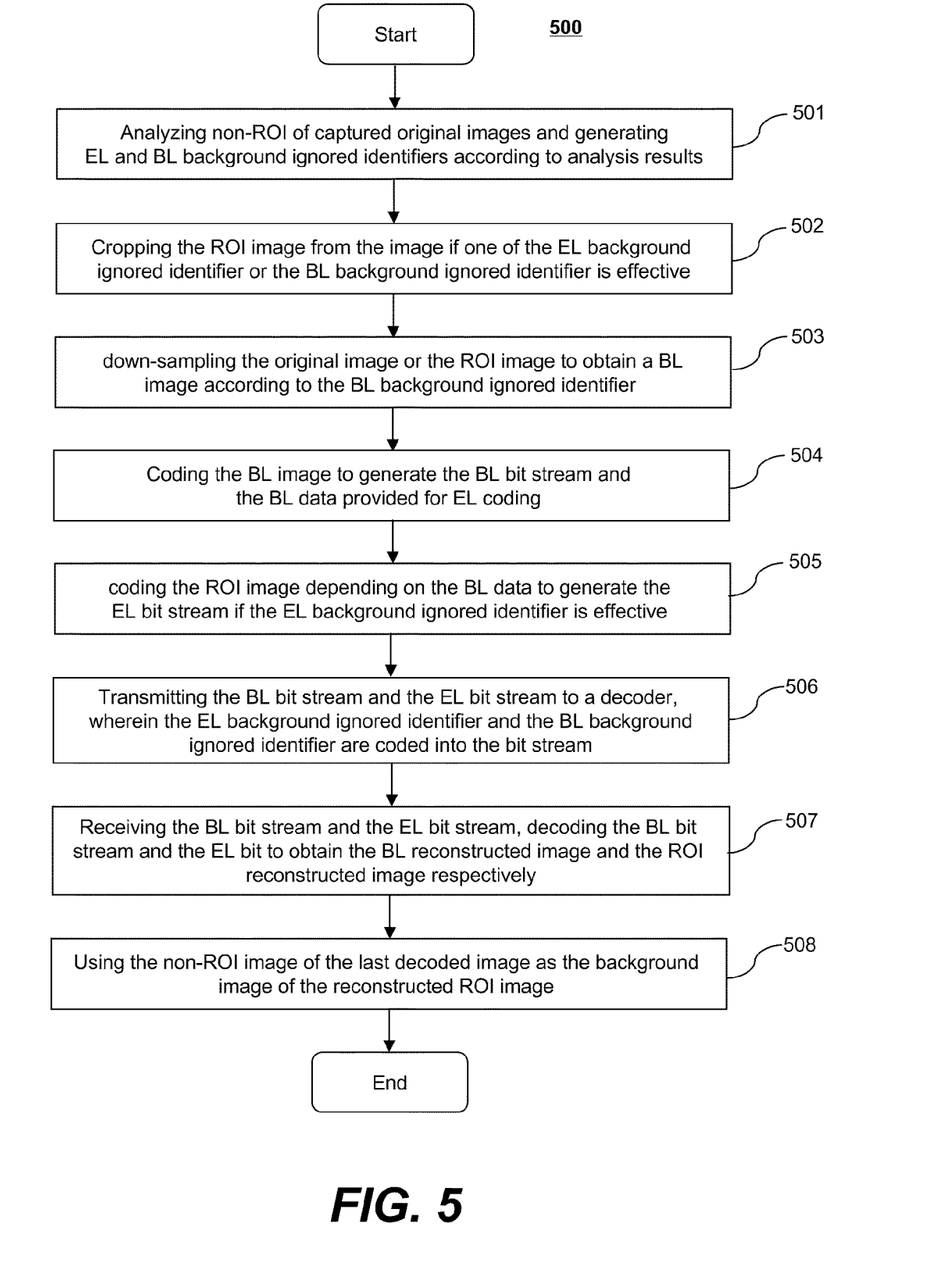
FIG. 5 is a flow chart showing the video codec method according to a second embodiment of the present invention.

FIG. 5 is a flowchart showing the video codec method 500 according to a second embodiment of the present invention. At 501, an intelligent analysis module is configured to analyze a non-ROI of a captured image, determine whether the non-ROI image of the original image has substantial changes relative to the non-ROI of a previous non-ROI image. The intelligent analysis module generates an ineffective background ignored identifier if the non-ROI image has substantial changes, otherwise, it generates an effective background ignored identifier. In the first embodiment, the intelligent analysis module may generate both a BL background ignored identifier and an EL background ignored identifier. If the background image (non-ROI image) is required to be ignored during BL coding, the effective BL background ignored identifier is generated; otherwise, the ineffective BL background ignored identifier is generated. Similarly, if the background image is required to be ignored during EL coding, the effective EL background ignored identifier is generated; otherwise, the ineffective EL background ignored identifier is generated.

At 502, an encoder is configured to determine whether the BL background ignored identifier or the EL background ignored identifier is effective, and crop an ROI image from the image if one of the EL back ground ignored identifier or the BL background ignored identifier is effective. If both the BL and the EL background ignored identifiers are ineffective, the encoder encodes the whole image in both BL and EL.

At 503, the encoder is configured to down-sample the original image or the ROI image to obtain a BL image according to the BL background ignored identifier. If the BL background ignored identifier is effective, the encoder down-sample the cropped ROI image of the original image to obtain the BL image; otherwise, the encoder down-sample the whole original image to obtain the BL image.

At 504, the encoder is further configured to code the BL image to generate the BL bit stream and the BL data for EL coding.

At 505, the encoder is configured to code the ROI image depending on the BL data to generate the EL bit stream if the EL background ignored identifier is effective, and EL code the whole original image depending on the BL information to generate the EL bit stream if the EL background ignored identifier is ineffective.

At 506, the encoder is configured further to transmit the BL bit stream and the EL bit stream to a decoder, wherein the EL background ignored identifier and the BL background ignored identifier are coded into the bit stream. Other frame or sequence level parameters are also transmitted to the decoder.

At 507, the decoder is configured to receive the BL bit stream and the EL bit stream, decode the BL bit stream to obtain the reconstructed BL image, and decode the EL bit stream depending on the reconstructed BL image to obtain the reconstructed ROI image if the EL background ignored identifier and the BL background ignored identifier are both effective.

At 508, the decoder is configured further to use the non-ROI image of the last decoded image as the background image of the reconstructed ROI image to form a whole decoded image.

A video codec system is provided according to the second embodiment of the present invention. The video codec system comprises an encoder and a decoder. The encoder is configured to crop a ROI image from the original image according to background ignored identifiers, down-sample the ROI image to obtain a BL image of the ROI image, code the BL image of the ROI image independently to generate a BL bit stream of the ROI image and BL information provided for EL coding, EL code the ROI image depending on the BL information to generate an EL bit stream of the ROI image, and transmit the BL bit stream and the EL bit stream of the ROI image to the decoder. The decoder is configured to receive the BL bit stream and the EL bit stream, and decoding the BL bit stream and the EL bit stream to obtain the BL reconstructed image of the ROI image and the ROI image.

In one embodiment, the encoder is configured further to transmit the EL background ignored identifier, the BL background ignored identifier and other frame or sequence level parameters to the decoder together after being coded. The decoder is configured further to obtain the BL reconstructed image of the ROI image and the ROI image if both the EL background ignored identifier and the BL background ignored identifier are effective. Additionally, the decoder is configured further to use the non-ROI image of the last decoded image as the background image of the reconstructed ROI image to form a whole decoded image.

Figure 6:
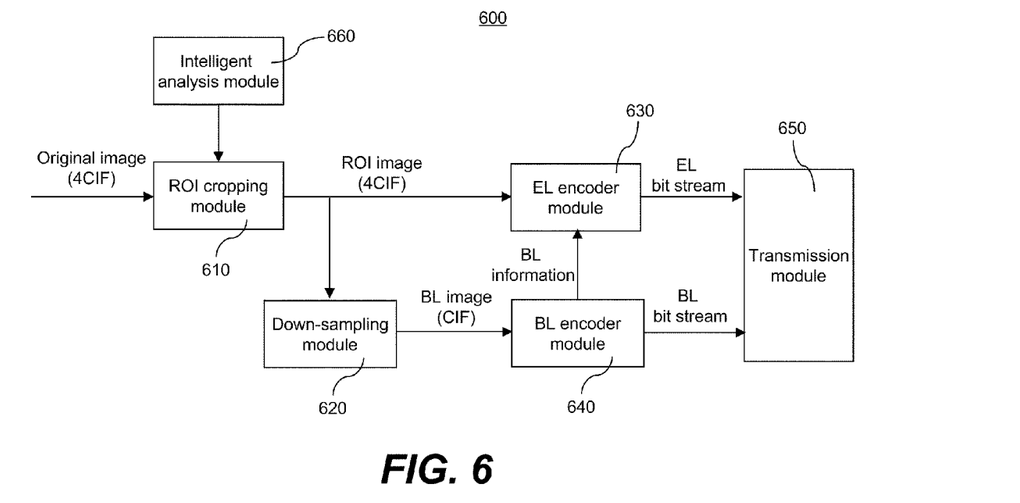
FIG. 6 is a block diagram showing an exemplary configuration of the video encoder according to the second embodiment of the present invention.

FIG. 6 is a block diagram showing an exemplary configuration of the video encoder 600 according to the second embodiment of the present invention. The video encoder 600 comprises a ROI cropping module 610, a down-sampling module 620, an EL encoder module 630 and a BL encoder 640. The ROI cropping module 610 is configured to crop a ROI image from an original image according to background ignored identifiers. The down-sampling module 620 is configured to down-sample the ROI image to obtain a BL image of the ROI image. The BL encoder 640 is configured to code the BL image of the ROI image independently to a BL bit stream of the ROI image and BL information provided for the EL encoder 630. The EL encoder 630 is configured to EL code the ROI image cropped by the ROI cropping module 610 depending on the BL information from the BL encoder 640 to generate an EL bit stream of the ROI image.

In one embodiment, the video encoder 600 further comprises a transmission module 650 configured to transmit the BL bit stream and the EL bit stream of the ROI image to a corresponding decoder. The transmission module 650 is configured further to transmit the BL background ignored identifier, the EL background ignored identifier and other frame or sequence level parameters after being coded to the decoder 302.

In one embodiment, the video encoder 600 further comprises an intelligent analysis module 660 configured to analyze the non-ROI image of the original image to determine whether the non-ROI of the original image has changes, generate an ineffective background ignored identifier if the non-ROI has changes, and generate an effective background ignored identifier if the non-ROI has no changes.

Figure 7:
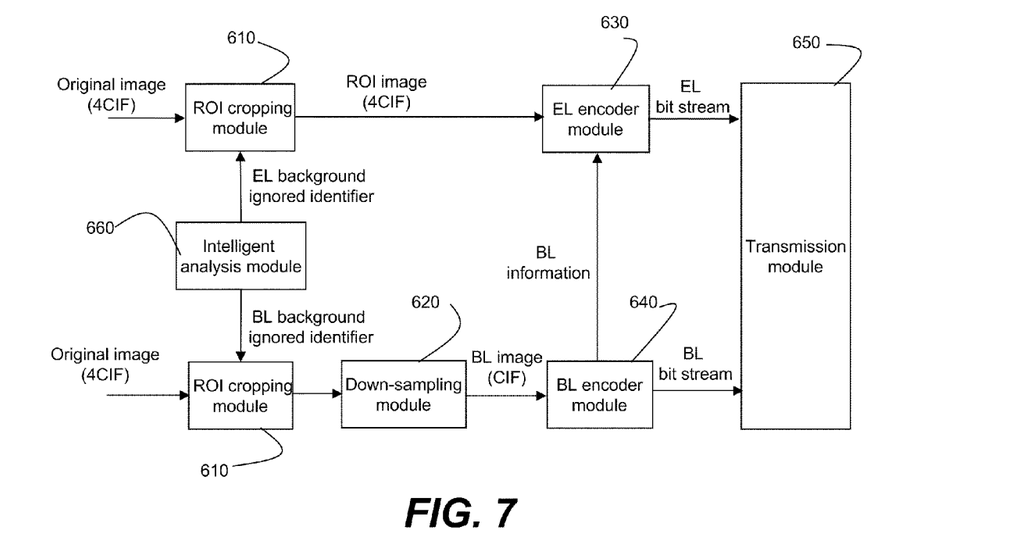
FIG. 7 is a block diagram showing another exemplary configuration of the video encoder according to the second embodiment of the present invention.

FIG. 7 is a block diagram showing another exemplary configuration of the video encoder according to the second embodiment of the present invention. Referring to FIG. 7, the intelligent analysis module 660 may generate a BL background ignored identifier indicating whether the non-ROI image is ignored during BL coding and an EL background ignored identifier indicating whether the non-ROI image is ignored during EL coding. Other parts of the video encoder shown in FIG. 7 are substantially similar to that shown in FIG. 6.

In one embodiment of the present invention, the ROI may have higher resolution to prevent content details thereof from losing when its current bit rate capacity is limited because only ROI of original images are EL coded sometimes.

The embodiments of the present invention mentioned above are proposed for scalable video coding method. However, the present invention also can be applied to other video coding methods. In the next paragraphs, one example of the present invention applied in other video coding methods is described.

Figure 8:
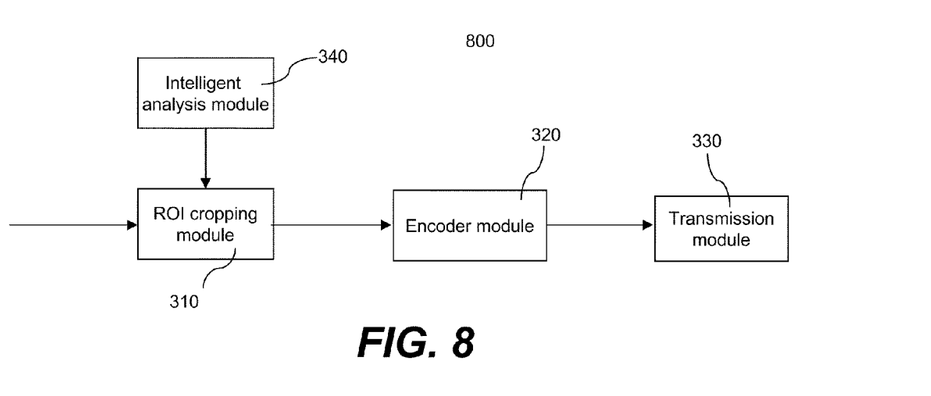
FIG. 8 is a block diagram showing the video encoder according to a third embodiment of the present invention.

FIG. 8 is a block diagram showing the video encoder 800 according to a third embodiment of the present invention. The video encoder 800 comprises a ROI cropping module 310, an encoder module 320 and a transmission module 330. The ROI cropping module 310 is configured to crop a ROI image from an image according to a background ignored identifier. If the background ignored identifier is effective, the ROI cropping module 310 crops the ROI image from the image and sends the cropped ROI image to the encoder module 320. If the background ignored identifier is ineffective, the ROI cropping module 310 doesn't crop the ROI image from the original image, but sends the whole image to the encoder module 320 directly. The encoder module 320 is configured to code the ROI image, or the whole image, received from the ROI cropping module 310 to generate a coded bit stream. The transmission module 330 is configured to transmit the coded bit stream to a video decoder. The transmission module 330 is configured further to transmit the background ignored identifier and other frame or sequence level parameters.

In one embodiment, the video encoder 800 further comprises an intelligent analysis module 340 configured to analyze the non-ROI image of the original image to determine whether the non-ROI of the image has substantial changes relative to that of a previous image. It generates an ineffective background ignored identifier if there are substantial changes, otherwise, it generates an effective background ignored.

Figure 9:
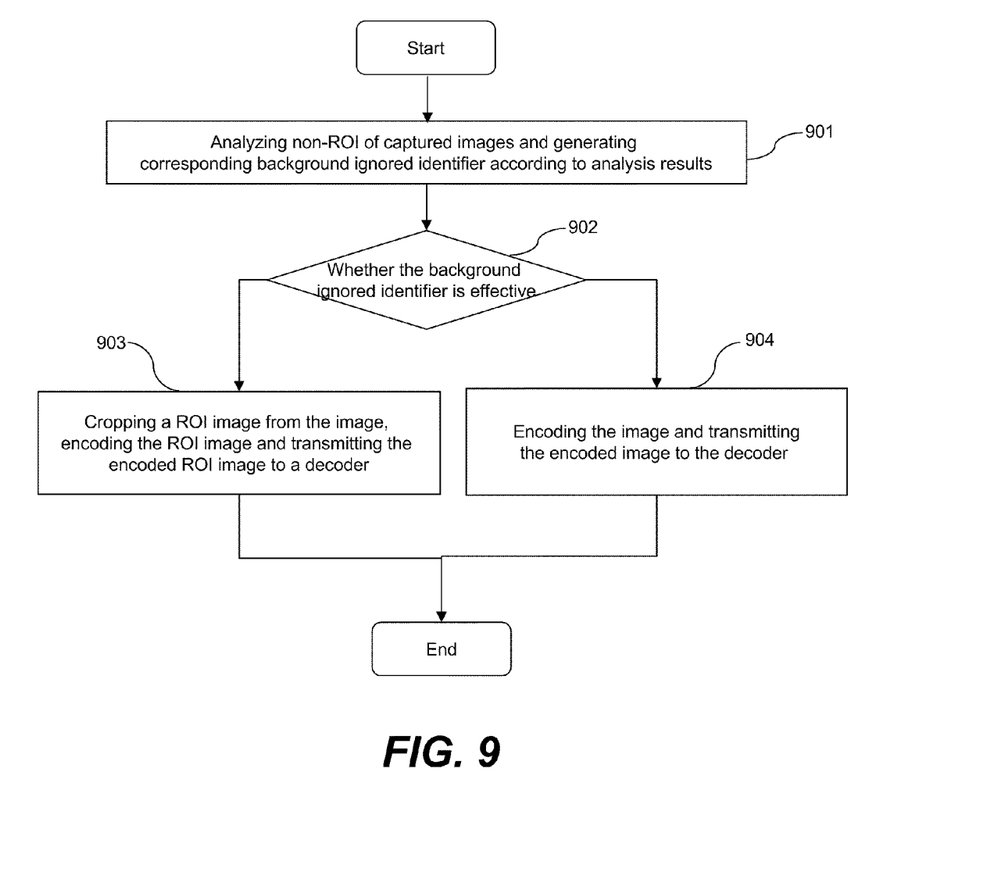
FIG. 9 is a block diagram showing a video coding method according to the third embodiment of the present invention.

FIG. 9 is a block diagram showing a video coding method 900 according to the third embodiment of the present invention. Referring to FIG. 9, the video coding method 900 comprises following operations:

At 901, an intelligent analysis module is configured to analyze a non-ROI of captured images and generate corresponding background ignored identifier according to analysis results.

At 902, an encoder is configured to determine whether the background ignored identifier is effective. If yes, the method 900 is taken to 903; otherwise, the method 900 is taken to 904.

At 903, the encoder crops an ROI image from the original image, encodes the ROI image and transmits the encoded ROI image to a video decoder. The background ignored identifier and other frame or sequence level parameters after is transmitted to the video decoder after being coded At 904, the encoder encodes the image and transmits the encoded image to the video decoder. Likewise, the background ignored identifier and other frame or sequence level parameters are also transmitted to the video decoder after being coded.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for encoding an image, the method comprising:
   receiving the image in a module;
   cropping a region of interest from the image in reference to an identified region of interest and an identified region of non-interest;
   generating a background ignored identifier indicating whether the region of non-interest is ignored;
   setting the background ignored identifier effective, when the region of non-interest is substantially similar to a region of non-interest in a previous image, otherwise, setting the background ignored identifier ineffective;
   down-sampling the original image or the cropped region of interest of the image to obtain a base layer image;

encoding the base layer image to generate a base layer bit stream and base layer data; and encoding the cropped region of interest of the image to generate an enhancement layer bit stream or the image to generate an enhancement layer bit stream when the background ignored identifier is ineffective, wherein the background ignored identifier includes:

a base layer background ignored identifier indicating whether the region of non-interest is ignored when the encoding of the base layer image is performed, and an enhancement layer background ignored identifier indicating whether the region of non-interest is ignored when the encoding of the cropped region of interest is performed, wherein the cropping of the region of interest from the image is performed as long as one of the base layer background ignored identifier and the enhancement layer background ignored identifier is effective, the encoding of the cropped region of interest is replaced by the encoding of the image to generate the enhancement layer bit stream when the enhancement layer background ignored identifier is ineffective.

2. The method according to claim 1, further comprising:
transmitting the enhancement layer bit stream and the base layer bit stream, wherein the background ignored identifier is encoded into each of the enhancement layer bit stream and the base layer bit stream.

3. The method according to claim 1, wherein the down-sampling of the image or the cropped region of interest down-samples the cropped region of interest to obtain the base layer image when the background ignored identifier is effective, or wherein the down-sampling of the image or the cropped region of interest of the image down-samples the image to the base layer image when the base ignored identifier is ineffective.

4. The method according to claim 3, further comprising:
transmitting the enhancement layer bit stream and the base layer bit stream to a decoder; wherein the base layer background ignored identifier and the enhancement layer background ignored identifier are encoded into the transmitted bit streams.

5. A method for decoding an image, the method comprising:

receiving an enhancement layer bit stream and a base layer bit stream from a video encoder;

extracting a background ignored identifier from either one of the enhancement layer bit stream and the base layer bit stream, wherein the background ignored identifier indicates whether a region of non-interest in the image is ignored, the background ignored identifier is set to be effective, when the region of non-interest is substantially similar to a region of non-interest in a previous image, otherwise, the background ignored identifier ineffective is set to be ineffective; and the background ignored identifier further includes:

a base layer background ignored identifier indicating whether the region of non-interest is ignored when encoding of the base layer image is performed, and an enhancement layer background ignored identifier indicating whether the region of non-interest is ignored when encoding of the cropped region of interest is performed, wherein cropping of the region of interest from the image is performed as long as one of the base layer background ignored identifier and the enhancement layer background ignored identifier is effective, the encoding of the cropped region of interest is replaced by encoding of the image to generate the enhancement layer bit stream when the enhancement layer background ignored identifier is ineffective, decoding the base layer bit stream to generate a reconstructed base layer image; and decoding the enhancement layer bit stream depending on the reconstructed base layer image and the background ignored identifier to generate a reconstructed region of interest of an original image.

6. The method according to claim 5, further comprising:
up-sampling a region of non-interest of the reconstructed base layer image to obtain the region of non-interest of the image;

combining the reconstructed region of interest of the image and the region of non-interest of the original image to obtain one whole image.

7. The method according to claim 5, further comprising:
receiving background ignored identifiers according to the bit streams.

8. An encoder for coding an image, the encoder comprising:

a region of interest (ROI) cropping module configured to crop the region of interest from the image according to a background ignored identifier, wherein the image includes an identified region of non-interest, a background ignored identifier is generated to indicate whether the region of non-interest is ignored, the background ignored identifier is set to be effective, when the region of non-interest is substantially similar to a region of non-interest in a previous image, otherwise, the background ignored identifier ineffective is set to be ineffective; and the background ignored identifier further includes:

a base layer background ignored identifier indicating whether the region of non-interest is ignored when the encoding of the base layer image is performed, and an enhancement layer background ignored identifier indicating whether the region of non-interest is ignored when the encoding of the cropped region of interest is performed, wherein the cropping of the region of interest from the image is performed as long as one of the base layer background ignored identifier and the enhancement layer background ignored identifier is effective, the encoding of the cropped region of interest is replaced by the encoding of the image to generate the enhancement layer bit stream when the enhancement layer background ignored identifier is ineffective, a down-sampling module configured to down-sample the image or the cropped region of interest of the image to obtain a base layer image;

a basic layer (BL) encoder module configured to encode the base layer image to generate a base layer bit stream and base layer data; and an enhanced layer (EL) encoder module configured to encode the cropped region of interest of the image depending on the base layer data to generate an enhancement layer bit stream, or the image to generate an enhancement layer bit stream when the background ignored identifier is ineffective, wherein the background ignored identifier includes:

a base layer background ignored identifier indicating whether the region of non-interest is ignored when the base layer image is encoded, and an enhancement layer background ignored identifier indicating whether the region of non-interest is ignored when the cropped region of interest is the encoded.

9. The encoder according to claim 8, further comprising:
a transmission module configured to transmit the enhancement layer bit stream and the base layer bit stream, wherein the background ignored identifier is coded into each of the enhancement layer bit stream and the base layer bit stream.

10. The encoder according to claim 8, further comprising:
an intelligent analysis module configured to determine whether the region of non-interest of the image can be ignored, generate an ineffective background ignored identifier if the region of non-interest image is substantially similar to a region of non-interest of a previous image, otherwise, generate an effective background ignored identifier.

11. The encoder according to claim 10, wherein the background ignored identifier comprises a base layer background ignored identifier indicating whether the region of non-interest of the image is ignored when the encoding of the base layer image is performed, and an enhancement layer background ignored identifier indicating whether the region of non-interest of the original image is ignored when the encoding of the enhancement layer image is performed.

* * * * *